United States Patent [19]
Froberg

[11] 3,897,234
[45] July 29, 1975

[54] METHOD AND APPARATUS FOR COOLING ELECTRICALLY-HEATED MELTING FURNACE

[75] Inventor: Magnus L. Froberg, Granville, Ohio

[73] Assignee: Owens-Corning Fiberglas Corporation, Toledo, Ohio

[22] Filed: Feb. 22, 1974

[21] Appl. No.: 445,037

[52] U.S. Cl. .................. 65/135; 65/137; 65/337; 65/355
[51] Int. Cl. .............................................. C03b 5/02
[58] Field of Search ............ 65/135, 137, 337, 346, 65/355, 356

[56] References Cited
UNITED STATES PATENTS

| 3,134,660 | 5/1964 | Long | 65/337 X |
| 3,400,204 | 9/1968 | Gell | 13/6 |
| 3,676,099 | 7/1972 | Fultz | 65/337 X |

*Primary Examiner*—Arthur D. Kellogg
*Attorney, Agent, or Firm*—Carl G. Staelin; John W. Overman; Allen D. Gutchess, Jr.

[57] ABSTRACT

An electrically heated, glass melting furnace with a cooling trough and with cooling means for the trough is provided. The furnace is heated by means of electrodes immersed in molten glass in the furnace; particularly as the throughput of the furnace increases, the molten glass becomes hotter. To overcome this, the cooling trough is provided in a portion of the furnace bottom, extending beyond to a riser, with the bottom and the side walls of the trough being exposed to ambient temperatures below the furnace. The resulting heat loss aids in cooling the glass flowing out of the furnace to overcome the inherent heat rise at high throughputs. Cooling means are also provided extending along the trough, with the rate of cooling achieved thereby being capable of selective control. Specifically, an air duct extends along the cooling trough and has outlets spaced therealong directed at the trough bottom to supply cooling air in heat exchange relationship with the bottom. Electrodes also can extend upwardly through the trough bottom into the trough, the electrodes serving to further cool the trough by providing heat conductive paths from the trough to the ambient conditions below the furnace. The trough electrodes, if desired, can also be heated by an emergency power supply to prevent glass from solidifying in the trough in the event that a major power failure should occur and power to the main heating electrodes is off.

8 Claims, 4 Drawing Figures

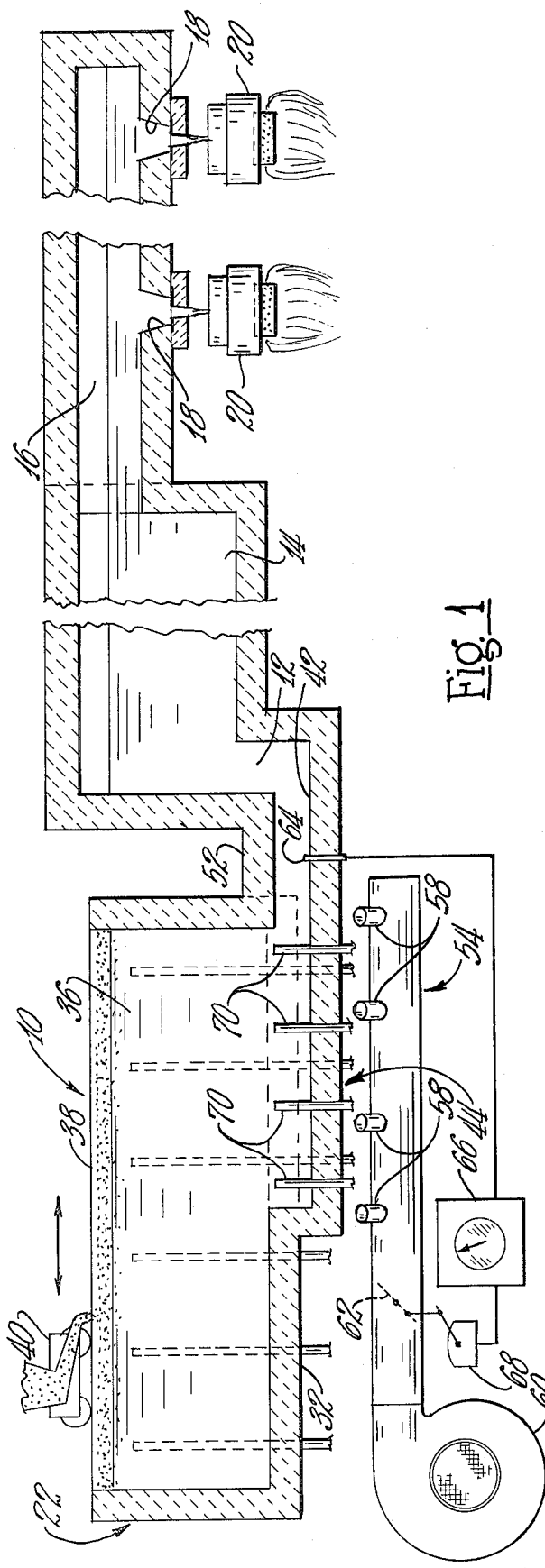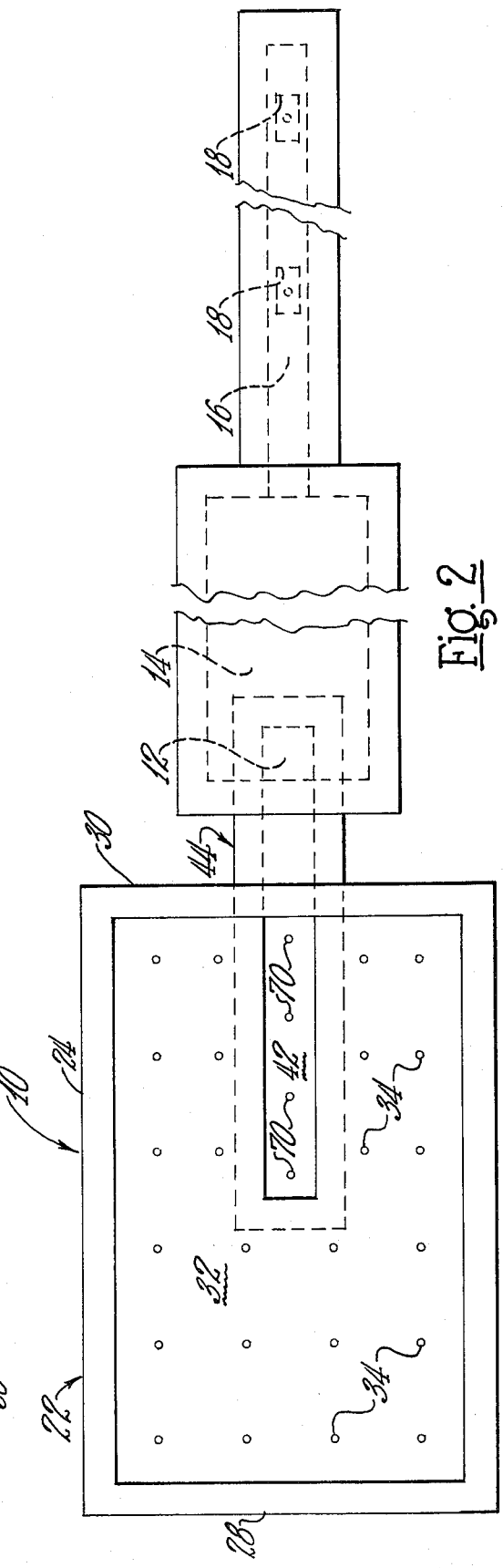

METHOD AND APPARATUS FOR COOLING ELECTRICALLY-HEATED MELTING FURNACE

This invention relates to an electrically heated, melting furnace having a cooling trough located in the bottom thereof.

Electrically heated, glass melting furnaces have been known in the art to a limited extent since the early 1900's. One problem with the earlier furnaces was the lack of effective electrodes by means of which the electric heating could be accomplished. More recently, satisfactory electrodes have been developed. At the same time, electric heating of glass melting furnaces has become more desirable since the electrically heated furnaces have a particular advantage in substantially eliminating pollution at the glass melting site. An additional advantage results when the electric power is generated by coal or nuclear fuel, in contrast to burners in conventional glass melting furnaces utilizing relatively scarce gas or oil as the fuel. However, the electric heat also has other advantages, including making it possible to obtain higher quality glass and a high degree of melting efficiency. Better control over the final glass composition can also be achieved, especially when there are more volatiles in the glass batch.

With conventional glass melting furnaces employing combustion burners firing over the molten glass, as the throughput of the furnace increases, the temperature of the glass tends to decrease. With electrically heated furnaces, however, with the electrodes immersed in the molten glass, an increase in the throughput has been found to result in an increase in the temperature of the molten glass exiting from the furnace. To overcome this, the furnace in accordance with the invention has a cooling trough centrally located in the bottom of the furnace tank and extending beyond a discharge end wall of the furnace to a riser. The cooling trough is designed so as to project below the main bottom of the tank, whereby both the sides and bottom of the trough are exposed to ambient conditions below the glass melting furnace. The cooling trough thereby presents a substantial surface area from which heat can be dissipated. The cooling trough preferably has a width not exceeding about one-fourth the width of the furnace bottom, and preferably has a depth at least equal to the width to assure substantial protrusion of the trough below the bottom of the tank and a correspondingly substantial degree of heat loss. The trough preferably extends not more than about one-half the distance between the end walls of the tank since the glass near the forward end of the tank has a minimal convection current, and a cooling trough at this portion of the tank would be less effective. The extra length of such a trough would increase the cost of the tank and increase general heat loss without having any real benefit on the cooling of the exiting glass through the trough at the discharge end of the tank.

Cooling means also extend along the cooling trough and provide a cooling medium in heat exchange relationship with the outer surfaces of the trough. More specifically, the cooling means can be in the form of an air duct extending along the trough and having a plurality of outlets directing air into contact with an outer surface of the cooling trough. The volume of air then can be controlled to control the extent of cooling of the trough. Temperature-sensing means can be located downstream in the trough to sense the temperature of the glass flowing therethrough, with a control unit controlling the air volume in response to the temperature. Hence, as the throughput increases and the glass temperature rises, the volume of the cooling medium can be increased to correspondingly increase the amount of heat dissipated from the surfaces of the trough.

Short electrodes can also be provided for the cooling trough with these electrodes extending through a wall of the trough, preferably the bottom, and having exposed portions below the furnace. The electrodes, being heat conducting, can thereby conduct heat from the molten glass in the trough to the ambient conditions below the furnace. The extent to which the electrodes protrude into the trough can also be controlled, with the degree of cooling by the electrodes thereby regulated. If desired, a power supply, preferably an emergency power supply, can be provided for the trough electrodes. In the event of a main power failure, power can then be supplied to the electrodes to heat the glass in the trough and prevent solidification.

It is, therefore, a principal object of the invention to provide an electrically heated, glass melting furnace achieving a more uniform temperature of the exiting glass even under conditions of varying throughput.

Another object of the invention is to provide an electrically heated glass melting furnace having a cooling trough in the bottom of a tank of the furnace, with the trough extending about half the length of the tank and beyond the discharge end wall thereof to a riser.

A further object of the invention is to provide an electrically heated, melting tank having a cooling trough in the bottom thereof extending below the bottom to provide heat loss from both the sides and the bottom of the trough.

Yet another object of the invention is to provide an electrically heated, melting furnace having a cooling trough in the bottom thereof and cooling means extending along the trough for supplying a cooling medium in heat exchange relationship with the other surface thereof.

Yet a further object of the invention is to provide a melting furnace having a cooling trough in the bottom thereof with cooling means for supplying a cooling medium in heat exchange relationship with the trough and with means for increasing the supply of cooling medium in response to an increase temperature of molten material flowing through the trough.

Still another object of the invention is to provide a melting furnace with a cooling trough in the bottom thereof into which electrodes extend to aid in cooling of molten material in the trough.

Many other objects and advantages of the invention will be apparent from the following detailed description of a preferred embodiment thereof, reference being made to the accompanying drawings, in which:

FIG. 1 is a schematic, fragmentary view in longitudinal cross section of a furnace embodying the invention;

FIG. 2 is a schematic, fragmentary, plan view of the furnace of FIG. 1, without glass in the furnace;

Figure 3:
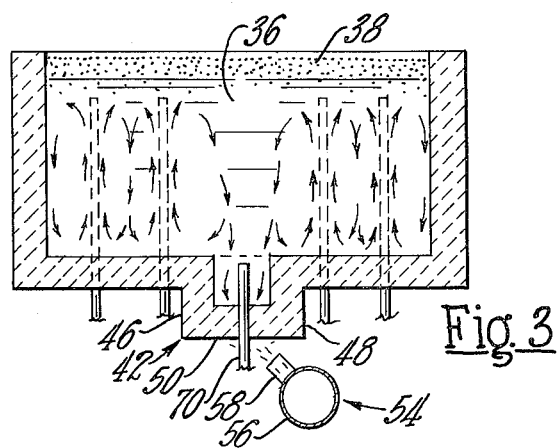
FIG. 3 is a schematic view in transverse cross section taken through the furnace of FIGS. 1 and 2.

Referring to the drawings, and particularly to FIGS. 1 and 2, an overall melting furnace embodying the invention is indicated at 10. The furnace is illustrated in connection with glass melting operations, although the furnace according to the invention can also be used to advantage in the melting of other materials. The furnace supplies molten glass to a riser 12, located beyond the discharge end, and to a conditioning chamber 14 and a forehearth 16. From the forehearth, the molten glass can be supplied through openings 18 to suitable fiber-forming devices 20 located therebelow. Of course, the furnace according to the invention is not limited to supplying glass for fiber-forming operations.

The furnace 10 includes a glass melting tank 22, formed by side walls 24 and 26, a forward end wall 28, a rear or discharge end wall 30, and a main bottom 32. A suitable roof (not shown) can be supported above the tank 22. Heating means for melting glass or other batch in the furnace 10 include a plurality of electrodes 34 extending upwardly into the tank 22 from a lower level through the bottom 32. The electrodes 34 are preferably positioned in a symmetrical manner with respect to a center line extending longitudinally through the tank 22, with electrodes toward the forward half of the tank being substantially uniformly spaced apart, and with those toward the discharge half of the tank being spaced farther apart at the center of the tank than at the sides. The portions of the electrodes 34 exposed below the tank bottom 32 can be protected by suitable sleeves containing an inert gas, and the electrodes can also be water cooled, as is well known in the art. Power is supplied to the electrodes 34 through suitable leads from a suitable power source (not shown).

The portions of the electrodes 32 within the tank 22 are totally immersed in a pool of molten glass 36, with the upper ends of the electrodes typically being about 10 inches below the surface of the molten glass 36. Additional glass batch is continually supplied over the molten glass 36 to form a batch layer 38 thereon which also serves as an effective insulating layer on the molten glass. The batch can be supplied from a batch carriage 40 which extends across the entire width of the tank 22 between the side walls 24 and 26 and is reciprocated back and forth substantially over the length of the tank. A carriage of this nature is disclosed more fully in a copending U.S. patent application of Charles M. Hohman, Ser. No. 409,196. The carriage can include one or more vibratory feeders to regulate the rate of feed of the batch from the carriage 40 to the layer 38.

When the output of the fiber-forming units 20 or other glass forming devices is increased, the throughput of the furnace 10 also must be increased. To accomplish this, more electrical power is supplied to the electrodes 32 and a larger quantity of batch is fed from the carriage 40. Since the heating means or electrodes are entirely immersed within the molten glass 36, the increased throughput with the increased power to the electrodes 32 results in a higher temperature in the molten glass supplied to the forehearth 16. This can be detrimental to the fiber-forming operation or other operation, particularly where the forehearth glass temperature is critical, as is true of fiber-forming operations. To achieve a more uniform glass temperature in the forehearth 16, in spite of increased glass pull or throughput, a cooling trough 42 in accordance with the invention is provided in the bottom of the tank 22. The trough 42 is formed by wall means indicated at 44 protruding below the bottom 32 of the tank 22, the wall means 44 constituting two side walls 46 and 48 (see FIGS. 3 and 4) and a bottom wall 50. These walls present three surfaces exposed to ambient conditions below the tank 22 to provide substantial heat loss to the ambient from the trough 42. The width of the trough 42 preferably is from one-sixth to one-fourth the width of the tank 22, with the depth of the trough preferably being at least equal to the width to provide adequate heat loss through the walls 46 and 48 and the bottom 50. The trough 42 is of a length sufficient to extend to the riser 12 past a throat 52 located between the tank and the riser. At the other end, the trough 42 preferably extends no more than about half the distance between the discharge end wall 30 and the forward end wall 28. Any shorter distance does not enable sufficient cooling to occur in the trough 42. If the trough extended further toward the forward end wall 28, it would not have any substantial beneficial cooling effect, particularly since convection currents in the molten glass toward the forward end are minimal. Consequently, the coolest glass would not necessarily collect in the trough to any noticeable extent toward the forward end. Thus, an extra length of the trough toward the forward end wall would only generally increase heat loss and result in higher construction costs for the furnace. Toward the discharge end of the tank 22, convection currents are more pronounced (FIG. 3) with the coolest glass collecting in the trough 42, thus reducing the cooling requirements for the glass flowing in a stream through the trough 42.

Cooling means are provided for the trough 42 to enable the cooling effect on the glass flowing through the trough to change as the throughput changes. In a preferred form, the cooling means in accordance with the invention are indicated at 54 and include a main duct 56 extending longitudinally of the trough 42 and a plurality of branch outlets 58 communicating therewith and directing a cooling medium, specifically air, toward the bottom 50 of the wall means 44. The cooling medium or air can be supplied by a suitable blower 60 (FIG. 1), with the volume of the air controlled by a damper or valve 62. The flow-control damper 62 can be opened more as the throughput of the furnace 10 increases and the glass discharged therefrom tends to increase in temperature. A higher volume of the air is then directed through the outlets 58 toward the bottom 50 of the trough thereby to increase the dissipation of heat from the trough and produce a greater cooling effect on the molten glass flowing therethrough.

The damper 62 can be automatically controlled, if desired. For this purpose, a temperature-sensing device or thermocouple 64 is located in the trough 42 toward the downstream end thereof with the device 64 being connected to a temperature controller 66. This, in turn, operates a control motor 68 which is operatively connected to the damper 62 so as to tend to close the damper 62 as the temperature sensed by the thermocouple 64 decreases and to open the damper 62 as the temperature sensed by the thermocouple 64 increases. The components 64, 66, and 68 are commercially available devices and are not discussed in detail.

Also, in accordance with the invention, a plurality of short electrodes 70 can be located in the trough 42, extending upwardly through the bottom 50 of the wall means 44. By themselves, the electrodes 70 are heat-conducting elements which can serve to cool the glass by conducting heat in the glass in the trough 42 to ambient conditions below the tank 22. If desired, each of the electrodes 70 can be provided with a gear drive 72 (FIG. 4) and a motor 74, by means of which the electrodes 70 can be raised so as to protrude further into the trough 42, or lowered so as to have a shorter length immersed in the trough. With this arrangement, the extent of the cooling effect of the electrodes 70 can be controlled. As the extent of protrusion of the electrodes into the trough increases, the cooling effect of the electrodes on the glass flowing through the trough also increases, as long as a sufficient portion of the length remains exposed so as to dissipate heat adequately. The streams of cooling air supplied by the outlets 58 can be directed at the exposed portions of the electrodes 70 below the bottom 50, if desired, to increase the rate of conduction of heat away from the glass in the trough by means of the electrodes.

Figure 4:
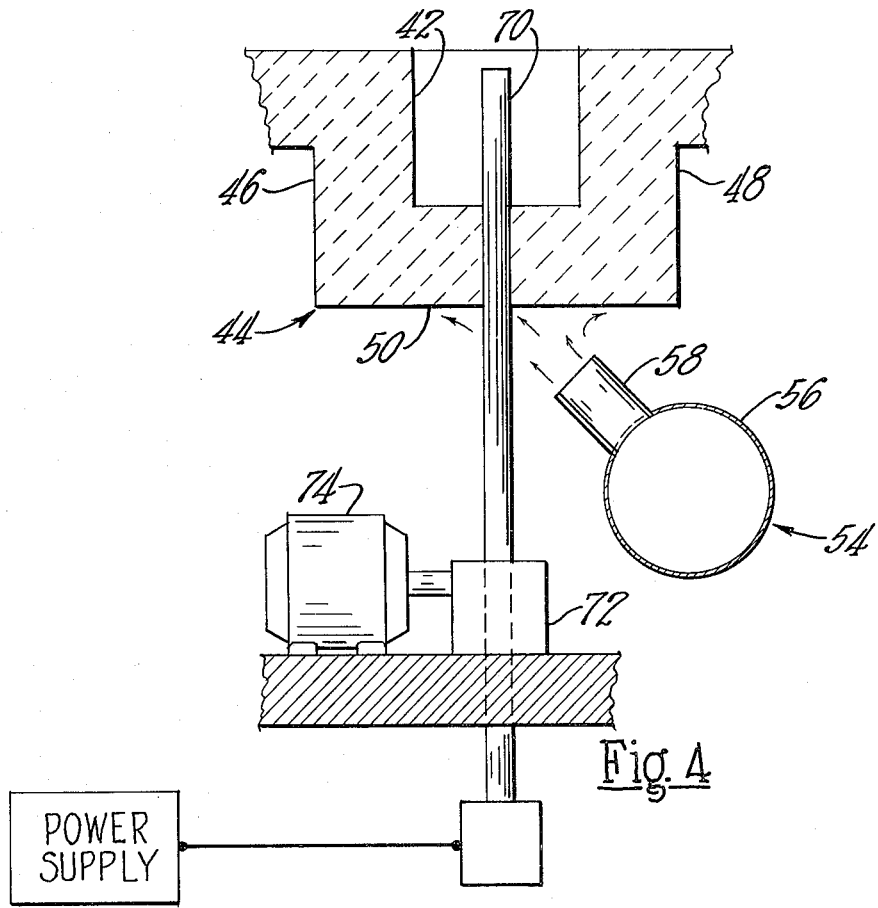
FIG. 4 is a greatly enlarged view of a portion of the furnace of FIG. 3, and showing certain additional details.

If desired, the electrodes 70 can also be connected to a power supply as indicated in FIG. 4, preferably an emergency power supply. In the event of a main power failure for the electrodes 32, the emergency power supply can be used to heat the electrodes 70 and thereby maintain the glass in the trough 42 in a molten condition under emergency conditions.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A furnace for melting a heat-softenable material, said furnace comprising a tank for holding molten material formed by a bottom, side walls, and end walls, means for supplying batch material over molten material in the tank, means extending into the molten material below the batch material for supplying heat to the molten material, wall means forming a cooling trough centrally located in the bottom of the tank, extending below the bottom of the tank, and extending beyond an end wall thereof to discharge molten material from the tank, said wall means being exposed at the sides as well as at the bottom of the trough to ambient conditions below the bottom of said tank to dissipate heat from molten material in said trough, and cooling means extending along said trough and effective to supply a cooling medium in heat exchange relationship with an external surface of said wall means.

2. A furnace according to claim 1 characterized by means for varying the quantity of the cooling medium carried by said cooling means.

3. A furnace according to claim 2 characterized by temperature-sensing means associated with said trough, and control means connected to said temperature-sensing means and to said quantity varying means for controlling the quantity of the cooling medium in response to the temperature sensed by the sensing means.

4. An electrically heated, glass melting furnace comprising a tank for molten glass formed by a bottom, side walls, and end walls, means for supplying glass batch over molten glass in the tank, a plurality of electrodes extending upwardly through the bottom of said tank in a predetermined pattern, wall means forming a trough centrally located below the bottom of said tank between the side walls thereof, said trough extending beyond one end wall of said tank and extending not more than about half the distance toward the other end wall, said wall means comprising a bottom and two sides exposed to ambient conditions below the bottom of said tank, and means forming a riser beyond the one end wall of the tank, said trough extending to said riser, cooling means extending longitudinally of said trough below the bottom thereof for supplying a cooling medium in heat-exchange relationship with the trough bottom, and means for varying the quantity of the cooling medium carried by said cooling means.

5. A furnace according to claim 4 characterized by temperature-sensing means associated with said trough, and control means connected to said temperature-sensing means and to said quantity varying means for controlling the quantity of the cooling medium in response to the temperature sensed by the sensing means.

6. A method of operating an electrically heated, melting furnace comprising establishing a pool of molten material, supplying batch material onto the surface of the pool to establish a layer of batch over the entire surface, heating the molten material below the batch layer, collecting molten material in a trough below the pool and extending not more than about one-half the length of the pool, directing the molten material in the trough toward a location beyond the pool, and cooling the molten material in the trough, by forcibly directing a cooling medium in heat-exchange relationship with the trough from a location outside the trough.

7. A method according to claim 6 characterized by, sensing the temperature of the molten material near the downstream end of the trough, and changing the volume of the cooling medium in response to the temperature sensed.

8. A furnace for melting a heat-softenable material, said furnace comprising a tank for holding molten material, means extending into the molten material below the surface thereof for supplying heat to the molten material, wall means forming a cooling trough located below a bottom of the tank and extending therebeyond to discharge molten material from the tank, said trough being located centrally in the bottom of the tank, and extending not more than about one-half of the length of the tank bottom, said wall means being exposed on the sides and the bottom to ambient conditions below the bottom of said tank to dissipate heat from molten material in said trough, cooling means extending along said trough and effective to supply a cooling medium in heat-exchange relationship with an external surface of said wall means, and means for varying the quantity of the cooling medium carried by said cooling means.

* * * * *